US012213223B1

(12) United States Patent
Xu

(10) Patent No.: US 12,213,223 B1
(45) Date of Patent: Jan. 28, 2025

(54) LED COLOR-CHANGING LAMP AND POWER SUPPLY CIRCUIT THEREOF

(71) Applicant: Yufeng Xu, Yichun (CN)

(72) Inventor: Yufeng Xu, Yichun (CN)

( * ) Notice: Subject to any disclaimer, the term of this patent is extended or adjusted under 35 U.S.C. 154(b) by 0 days.

(21) Appl. No.: 18/811,360

(22) Filed: Aug. 21, 2024

(51) Int. Cl.

| | |
|---|---|
| ***H05B 45/382*** | (2020.01) |
| ***F21V 17/10*** | (2006.01) |
| ***F21V 23/06*** | (2006.01) |
| ***H05B 45/20*** | (2020.01) |
| ***H05B 45/305*** | (2020.01) |
| ***H05B 45/39*** | (2020.01) |
| *F21Y 115/10* | (2016.01) |

(52) U.S. Cl.
CPC ........... *H05B 45/39* (2020.01); *F21V 17/105* (2013.01); *F21V 23/06* (2013.01); *H05B 45/20* (2020.01); *H05B 45/305* (2020.01); *H05B 45/382* (2020.01); *F21Y 2115/10* (2016.08)

(58) Field of Classification Search
CPC .... H05B 45/20; H05B 45/305; H05B 45/382; F21V 17/105; F21V 23/06
See application file for complete search history.

(56) References Cited

U.S. PATENT DOCUMENTS

2014/0159608 A1* 6/2014 Simi ...................... H05B 45/59 315/205
2020/0236755 A1* 7/2020 Wang ...................... H05B 45/31
2021/0400789 A1* 12/2021 Palliyil Chundethodiyil .............. H05B 45/345

OTHER PUBLICATIONS

MT3612 Datasheet (Year: 2020).*

* cited by examiner

*Primary Examiner* — Alexander H Taningco
*Assistant Examiner* — Pedro C Fernandez
(74) *Attorney, Agent, or Firm* — Birchwood IP

(57) ABSTRACT

A power supply circuit for an LED color-changing lamp is provided, which includes an input rectification circuit, an input filtering circuit, a control circuit, a transformer T1, an output rectification circuit, and an output filtering circuit; an input terminal of the input rectification circuit is connected to an AC power, an output terminal of the input rectification circuit is connected to the input filtering circuit. The input filtering circuit and the control circuit are both connected to an original side of the transformer T1; the output rectification circuit and the output filtering circuit are both connected to a secondary side of the transformer T1. The control circuit includes a first chip U1 in a model of MT3612. Through the above arrangement, the circuit is more integrated, the number of components in the circuit is reduced, the circuit structure is simplified, and the volume of the circuit board is reduced.

9 Claims, 4 Drawing Sheets

LED COLOR-CHANGING LAMP AND POWER SUPPLY CIRCUIT THEREOF

TECHNICAL FIELD

The present disclosure relates to the field of LED lamp technologies, and in particular, to an LED color-changing lamp and a power supply circuit thereof.

BACKGROUND

A color-changing lamp is a type of lighting fixture that can change color by adjusting color and brightness of light to achieve different lighting effects. The color-changing lamp has a wide range of applications in the field of lighting, such as an LED (light-emitting diode) reading light, an LED pendant light, an LED floor lamps, an LED spotlight, and other scenarios. In addition, due to its ability to provide suitable light colors and effects for different scenes and environments, it is also widely used in entertainment venues, commercial places, and home lighting. In the existing power supply circuits for LED color-changing lamps, a PWM (pulse width modulation) controller is usually used to control the switching of a MOS transistor (Metal Oxide Semiconductor) to achieve lamp brightness adjustment. However, the existing PWM controller and MOS transistor are usually set as independent components in the circuit, and the PWM controller also need to set multiple peripheral components, which renders the circuit use a large number of components, has a complex circuit structure, occupies a large PCB (printed circuit board) area, and is not conducive to miniaturization.

SUMMARY

Embodiments of the present disclosure provide an LED color-changing lamp and a power supply circuit thereof, which can reduce the number of components in the circuit, simplify a circuit structure, and facilitate the reduction of volume.

In order to achieve the above objectives, the embodiments of the present disclosure provide a power supply circuit for an LED color-changing lamp, including an input rectification circuit, an input filtering circuit, a control circuit, a transformer T1, an output rectification circuit, and an output filtering circuit;

an input terminal of the input rectification circuit is connected to an AC power, an output terminal of the input rectification circuit is connected to the input filtering circuit; the input filtering circuit and the control circuit are both connected to an original side of the transformer T1, the output rectification circuit and the output filtering circuit are both connected to a secondary side of the transformer T1;

the control circuit includes a first chip U1, a resistor R1, a resistor R3, a resistor R4, a resistor R6, a resistor R7, a resistor R8, a capacitor C1, an electrolytic capacitor EC4, a diode D1, and a diode D2; the first chip U1 is in a model of MT3612;

a VCC pin of the first chip U1 is connected to a first end of the original side of the transformer T1 through the resistor R8; a C0 pin and a C pin of the first chip U1 are both connected to a positive pole of the diode D1; a negative pole of the diode D1 is connected to the first end of the original side of the transformer T1 through the resistor R3; a second end of the original side of the transformer T1 is connected to the positive pole of the diode D1; one end of the resistor R1 is connected to the negative pole of the diode D1, and the other end of the resistor R1 is connected to the first end of the original side of the transformer T1 through the capacitor C1; a CS pin and an E pin of the first chip U1 are both grounded through the resistor R4; a positive pole of the electrolytic capacitor EC4 is connected to the VCC pin; a negative pole of the electrolytic capacitor EC4 is grounded, a FB pin of the first chip U1 is connected to a third end of the original side of the transformer T1 through the resistor R7, the third end of the original side of the transformer T1 is further connected to a positive pole of the diode D2, and a negative pole of the diode D2 is connected to the VCC pin; one end of the resistor R6 is connected to the FB pin, and the other end is grounded; a fourth end of the original side of the transformer T1 is grounded.

In some embodiments of the present disclosure, the input rectification circuit includes a bridge rectifier DB1, a first input terminal of the bridge rectifier DB1 is connected to a live wire, a second input terminal of the bridge rectifier DB1 is connected to a neutral wire, a first output terminal of the bridge rectifier DB1 is grounded, and a second output terminal of the bridge rectifier DB1 is connected to the input filtering circuit.

In some embodiments of the present disclosure, the input filtering circuit includes a resistor R2, an inductor L1, an inductor L2, an electrolytic capacitor EC2, and an electrolytic capacitor EC3; one end of the resistor R2, one end of the inductor L1, and a positive pole of the electrolytic capacitor EC3 are all connected to the second output terminal of the bridge rectifier DB1; the other end of the resistor R2, the other end of the inductor L1, and a positive pole of the electrolytic capacitor EC2 are all connected to the first end of the original side of the transformer T1; one end of the inductor L2 and a negative pole of the electrolytic capacitor EC3 are grounded, and the other end of the inductor L2 and a negative pole of the electrolytic capacitor EC2 are grounded.

In some embodiments of the present disclosure, the power supply circuit further includes a capacitor CY1, and both ends of the capacitor CY1 are grounded.

In some embodiments of the present disclosure, the output rectification circuit includes a second chip U2, the second chip U2 is in a model of MT6704, a VCC pin of the second chip U2 is connected to a first end of the secondary side of the transformer T1; a SW pin, a SW1 pin, a SW2 pin, and a SW3 pin of the second chip U2 are all connected to a second end of the secondary side of the transformer T1, a GND pin, a GND1 pin, and a GND2 pin of the second chip U2 are all grounded.

In some embodiments of the present disclosure, the output filtering circuit includes an electrolytic capacitor EC1 and a resistor R5, a positive pole of the electrolytic capacitor EC1 and one end of the resistor R5 are both connected to the first end of the secondary side of the transformer T1, and a negative pole of the electrolytic capacitor EC1 and the other end of the resistor R5 are both grounded.

In some embodiments of the present disclosure, the input terminal of the input rectification circuit is further connected to a fuse F1.

Embodiments of the present disclosure further provides an LED color-changing lamp, including an LED lamp body and a power supply circuit configured to drive the LED lamp body to emit light, and the power supply circuit is the power supply circuit as described above.

In some embodiments of the present disclosure, LED lamp body includes a Lamp bead, a bulb base, a magnetic attraction member, a charging plug, a fixing base, a button, and a translucent body;

where the magnetic attraction member is fixedly connected to a bottom of the bulb base, the bulb base has a connection plug, the fixing base is fixedly connected to the translucent body; the power supply circuit, the charging plug, and the button are fixedly installed inside the fixing base; the control circuit board has the power supply circuit, and the fixing base further has a base socket and a magnet that cooperates with the magnetic attraction member, so that the bulb base is fixed on the fixing base by a magnetic attraction of the magnetic attraction member, and the connection plug of the bulb base is electrically connected to the base socket.

Beneficial effects of the present disclosure: the power supply circuit of the LED color-changing lamp of the present disclosure includes an input rectification circuit, an input filtering circuit, a control circuit, a transformer T1, an output rectification circuit, and an output filtering circuit; the input terminal of the input rectification circuit is connected to an AC power, and the output terminal of the input rectification circuit is connected to the input filtering circuit. The input filtering circuit and the control circuit are both connected to the original side of transformer T1, and the output rectification circuit and the output filtering circuit are both connected to the secondary side of transformer T1. The control circuit includes a first chip U1, the first chip is in a model of MT3612, the MT3612 chip is an original side feedback control chip that integrates with a power switch transistor and a PWM controller; so that the circuit is more integrated, which can reduce the number of components in the circuit, simplify the circuit structure, and is conducive to reducing volume of the circuit board.

BRIEF DESCRIPTION OF DRAWINGS

Combining with the accompanying drawings, a detailed description of the specific implementation modes of the present disclosure will render the technical solution and its beneficial effects obvious.

DESCRIPTION OF EMBODIMENTS

Please refer to the drawings, where the same reference number represent the same component. The principle of the present disclosure is illustrated by implementing it in an appropriate computing environment. The following explanation is based on the specific embodiments of the present disclosure illustrated, and should not be construed as limiting other specific embodiments of the present disclosure that are not described in detail herein.

Figure 1:
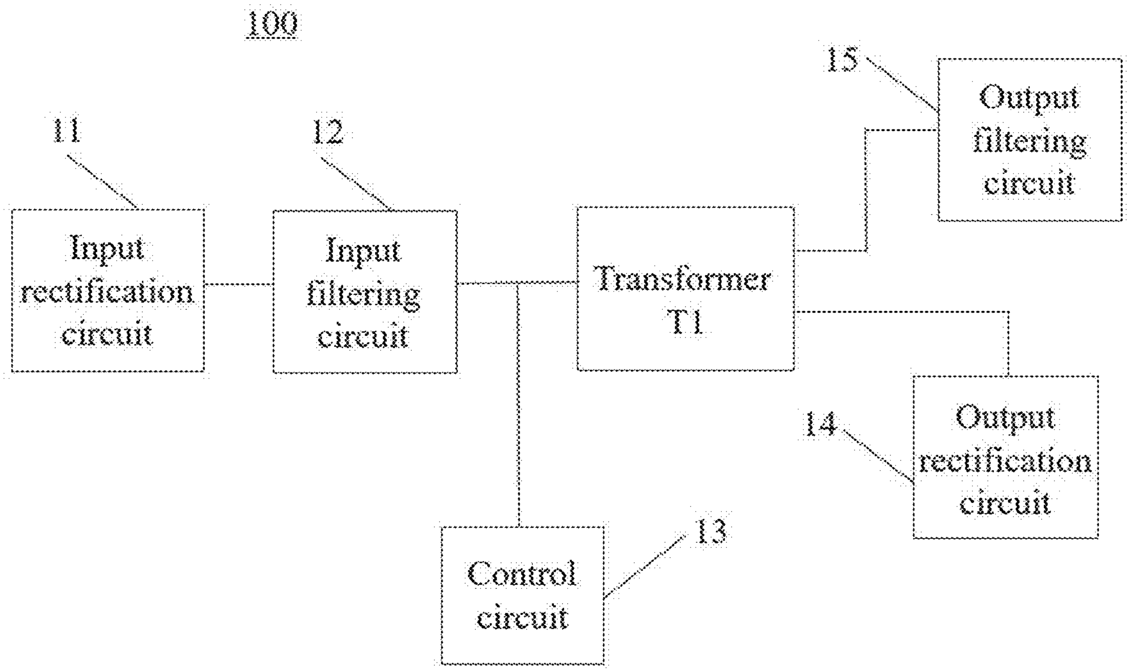
FIG. 1 is a schematic diagram of a power supply circuit provided by some embodiments of the present disclosure.
Figure 2:
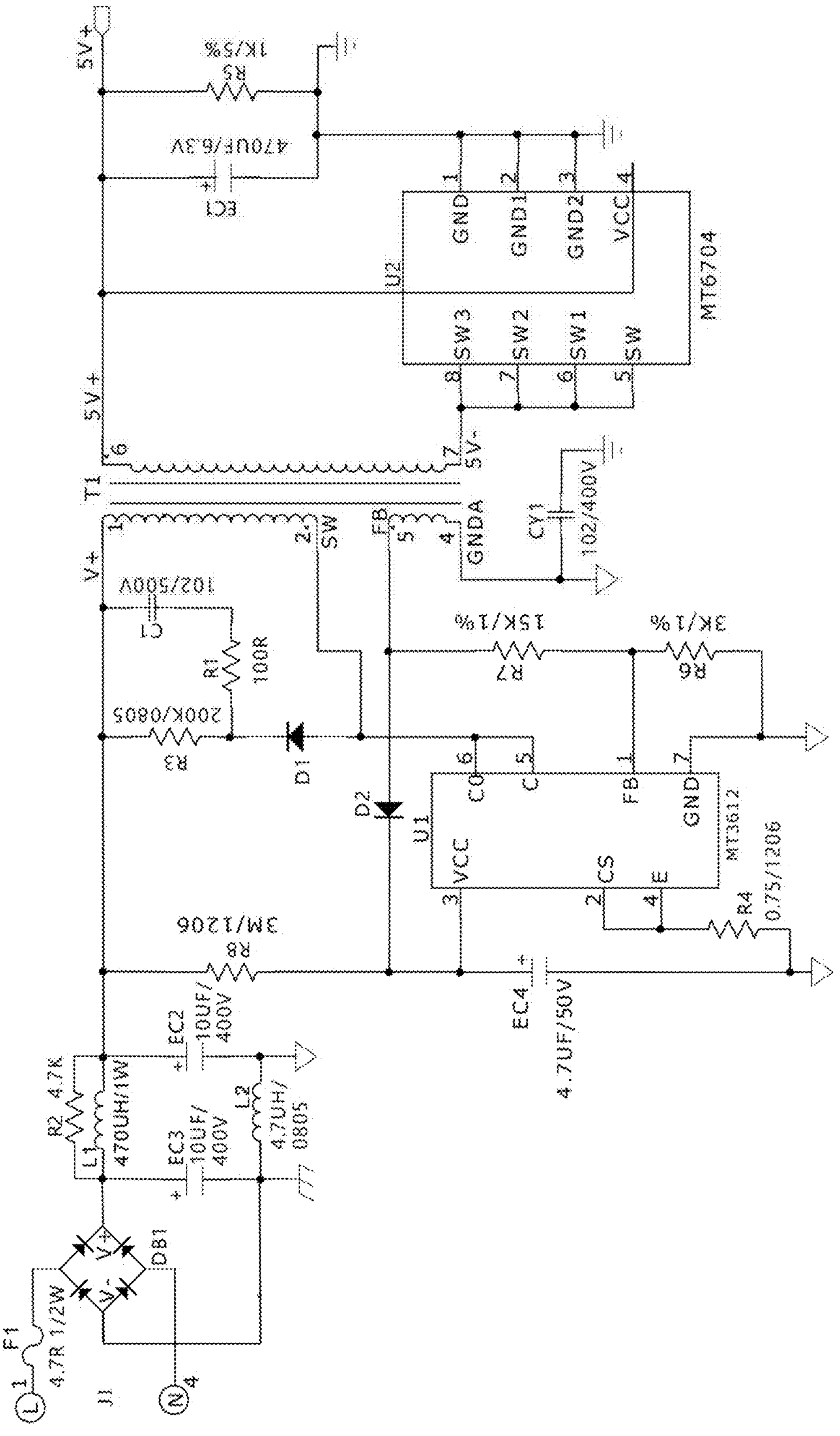
FIG. 2 is a specific implementation circuit diagram of the power supply circuit provided in some embodiments of the present disclosure.

Referring to FIGS. 1 and 2, a power supply circuit 100 of an LED color-changing lamp in an embodiment of the present disclosure includes an input rectification circuit 11, an input filtering circuit 12, a control circuit 13, a transformer T1, an output rectification circuit 14, and an output filtering circuit 15.

An input terminal of the input rectification circuit 11 is connected to an AC (alternating current) power, an output terminal of the input rectification circuit 11 is connected to the input filtering circuit 12. The input filtering circuit 12 and the control circuit 13 are both connected to an original side of the transformer T1; the output rectification circuit 14 and the output filtering circuit 15 are both connected to a secondary side of the transformer T1. The control circuit 13 includes a first chip U1, a resistor R1, a resistor R3, a resistor R4, a resistor R6, a resistor R7, a resistor R8, a capacitor C1, an electrolytic capacitor EC4, a diode D1, and a diode D2; the first chip is in a model of MT3612.

A VCC (volt current condenser) pin of the first chip U1 is connected to a first end of the original side of the transformer T1 through the resistor R8. A C0 pin and a C pin of the first chip U1 are both connected to a positive pole of the diode D1. A negative pole of the diode D1 is connected to the first end of the original side of the transformer T1 through the resistor R3. A second end of the original side of the transformer T1 is connected to the positive pole of the diode D1. One end of the resistor R1 is connected to the negative pole of the diode D1, and the other end of the resistor R1 is connected to the first end of the original side of the transformer T1 through the capacitor C1. A CS (current sense) pin and an E (Emitter) pin of the first chip U1 are both grounded through the resistor R4. A positive pole of the electrolytic capacitor EC4 is connected to the VCC pin. A negative pole of the electrolytic capacitor EC4 is grounded, and a FB (voltage feedback) pin of the first chip U1 is connected to a third end of the original side of the transformer T1 through the resistor R7, the third end of the original side of the transformer T1 is further connected to a positive pole of the diode D2, and a negative pole of the diode D2 is connected to the VCC pin. One end of the resistor R6 is connected to the FB pin, and the other end is grounded. A fourth end of the original side of the transformer T1 is grounded. where, the pin C0 is a drain electrode of the power switch transistor.

Where, the MT3612 chip is an original side feedback control chip that integrates with a power switch transistor and a PWM controller. Therefore, compared with existing wats, the circuit is more integrated, which can reduce the number of components in the circuit, simplify the circuit structure, and is conducive to reducing volume of the circuit board.

Where the power switch transistor is a MOS transistor, the PWM controller is used to control the opening and closing of the power switch transistor.

Where, the input rectification circuit 11 includes a bridge rectifier DB1, a first input terminal of the bridge rectifier DB1 is connected to a live wire L, a second input terminal of the bridge rectifier DB1 is connected to a neutral wire N, a first output terminal of the bridge rectifier DB1 is grounded, and a second output terminal of the bridge rectifier DB1 is connected to the input filtering circuit 12. The input filtering circuit 12 includes a resistor R2, an inductor L1, an inductor L2, an electrolytic capacitor EC2, and an electrolytic capacitor EC3. One end of the resistor R2, one end of the inductor L1, a positive pole of the electrolytic capacitor EC3 are all connected to the second output terminal of the bridge rectifier DB1. The other end of the resistor R2, the other end of the inductor L1, and a positive pole of the electrolytic capacitor EC2 are all connected to the first end of the original side of the transformer T1. One end of the inductor L2 and a negative pole of the electrolytic capacitor EC3 are grounded, and the other end of the inductor L2 and a negative pole of the electrolytic capacitor EC2 are grounded.

In an implementation, the power supply circuit 100 further includes a capacitor CY1, both ends of the capacitor CY1 are grounded.

Where, the output rectification circuit 14 includes a second chip U2, the second chip U2 is in a model of MT6704. A VCC pin of the second chip U2 is connected to a first end of the secondary side of the transformer T1, and a SW (Switch) pin, a SW1 pin, a SW2 pin, and a SW3 pin of the second chip U2 are all connected to a second end of the secondary side of the transformer T1. A GND (Ground) pin, a GND1 pin, and a GND2 pin of the second chip U2 are all grounded. The MT6704 chip is a secondary side synchronous rectification power switch. By using this chip to achieve rectification function, power consumption of this device can be reduced, and circuit efficiency can be improved.

Where, the output filtering circuit 15 includes an electrolytic capacitor EC1 and a resistor R5. A positive pole of the electrolytic capacitor EC1 and one end of the resistor R5 are both connected to the first end of the secondary side of the transformer T1, and a negative pole of the electrolytic capacitor EC1 and the other end of the resistor R5 are both grounded.

Where, an input terminal of the input rectifier circuit 11 is further connected with a fuse F1, that is, a first input terminal of the bridge rectifier DB1 is connected with the fuse F1 in series.

In the embodiments of the present disclosure, the first chip U1 is in a model of MT3612, which is a low-power original side feedback control chip. When the internal PWM controller controls the power switch transistor to conduct, voltage output from the input filtering circuit 12 charges an original side inductance of the transformer T1 through a V+ terminal, that is, the first end of the transformer T1, so as to store energy, and is coupled to the secondary side through the transformer T1, to provide working voltage for the LED lamp through the secondary side output voltage. For example, as shown in FIG. 2, the secondary side of the transformer T1 outputs 5V voltage; when the power switch transistor inside the first chip U1 is disconnected, the energy stored in the inductance of the original side of the transformer T1 is reversed to supply power to the secondary side of the transformer T1, so that the secondary side of the transformer T1 maintains a stable output voltage, thereby enabling the LED lamp to obtain a stable operating voltage. Where, by controlling a duty cycle of a PWM signal output by the PWM controller, output voltage of the transformer T1 can be controlled, thereby achieving a goal of adjusting the brightness of the LED light.

Some embodiments of the present disclosure further provide an LED color-changing lamp, including an LED lamp and the power supply circuit that is configured to drive the LED lamp to emit light. The power supply circuit is the power supply circuit described in the above embodiments.

Figure 3:
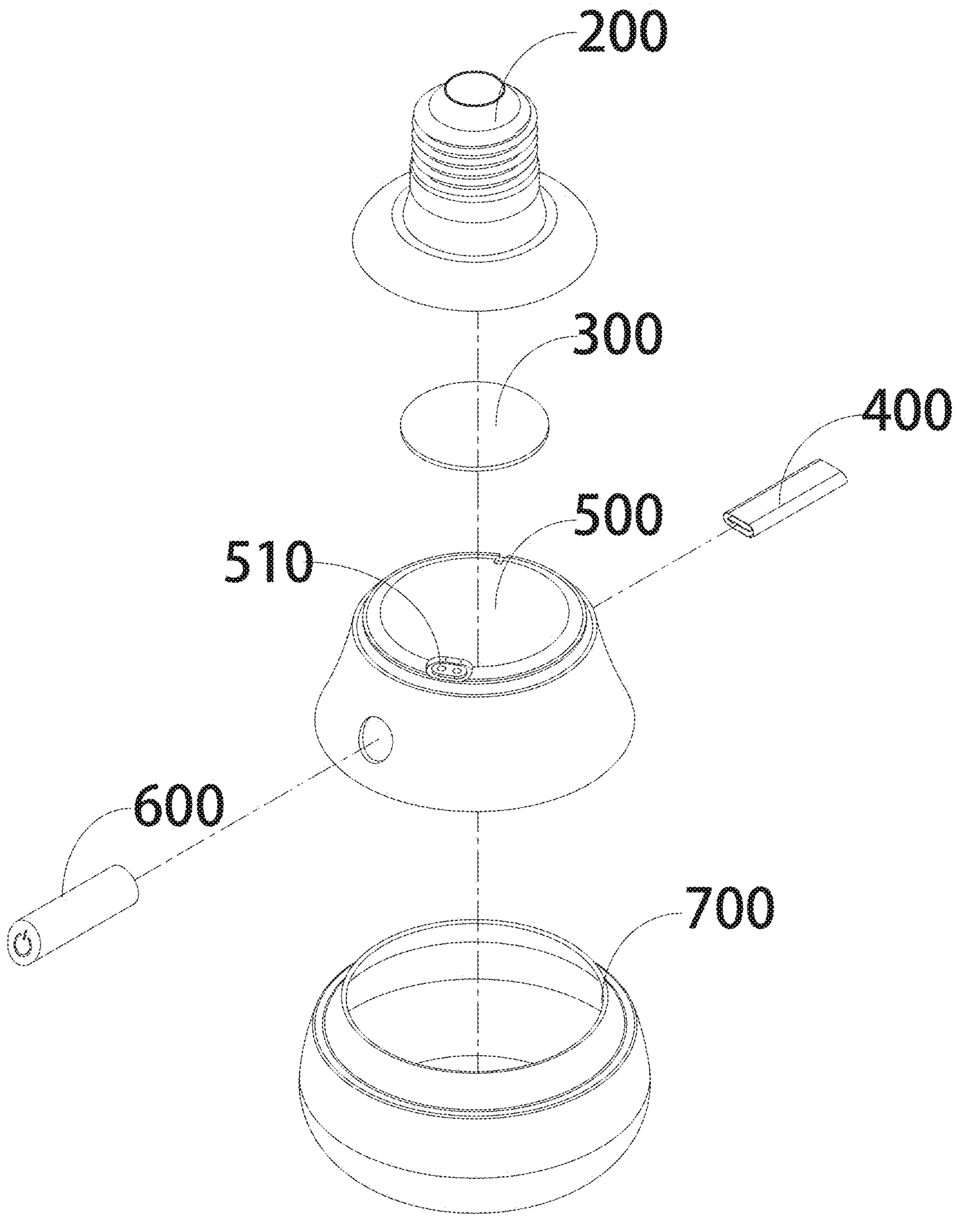
FIG. 3 is a schematic structural diagram of an LED color-changing lamp provided in some embodiments of the present disclosure.

Referring to FIG. 3, an embodiment of an LED color-changing lamp is shown, the LED color-changing lamp includes a LED lamp body and the power supply circuit 100 configured to drive the LED lamp body to emit light. The power supply circuit 100 is the power supply circuit in the above embodiments. The LED light body includes a LED lamp bead (not shown in the drawings), a bulb base 200, a magnetic attraction member 300, a charging plug 400, a fixing base 500, a button 600, and a translucent body 700. The magnetic attraction member 300 is fixedly connected to a bottom of the bulb base 200, the bulb base 200 includes a connection plug (not shown in the drawings). The fixing base 500 is fixedly connected to the translucent body 700; a control board (not shown in the drawings), the charging plug 400, and the button 600 are installed inside the fixing base 500. The control circuit board has the power circuit 100, which drives the LED lamp bead to emit light. The fixing base 500 further includes a magnet (not shown in the figure) that matches with the magnetic attraction member 300, as well as a base socket 510. Thus, the bulb base 200 is fixed to the fixing base 500 by a magnetic attraction of the magnetic attraction member 300, and the connection plug (not shown in the drawings) of the bulb base 200 is electrically connected to the base socket 510. External power supply can be used to power the LED light through the bulb base 200 or through the charging plug 400.

Figure 4:
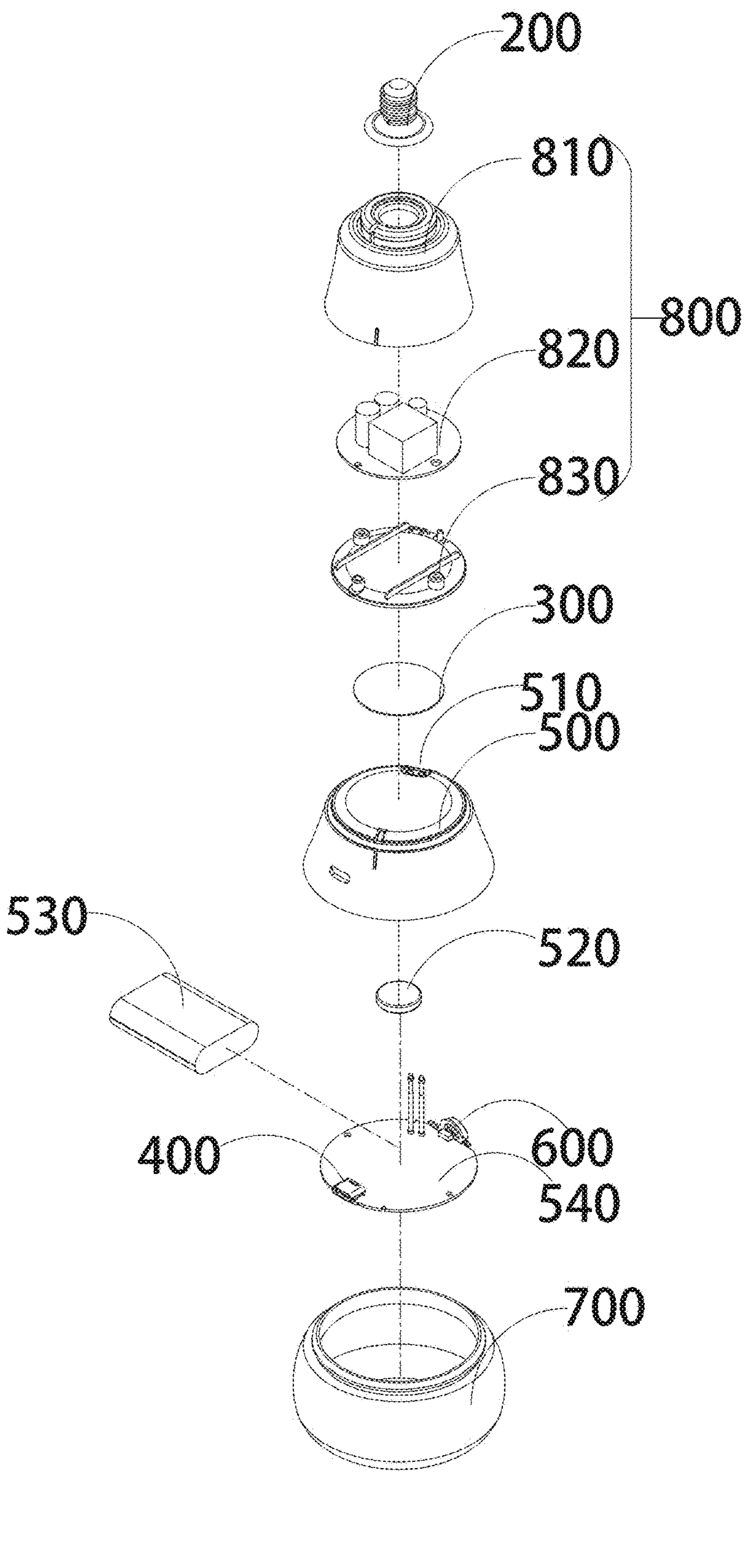
FIG. 4 is another schematic structural diagram of the LED color-changing lamp provided in some embodiments of the present disclosure.

Referring to FIG. 4, another embodiment of an LED color-changing lamp is shown, which includes a bulb base 200, a magnetic attraction member 300, a charging plug 400, a fixing base 500, a button 600, a translucent body 700, and a connection base 800. The bulb base 200 is fixedly connected to the connection base 800, the connection base 800 includes a connection housing 810, a first circuit board 820, and a connection base 830. The first circuit board 820 has a power circuit 10. The magnetic attraction member 300 is fixedly connected to a bottom of the connection base 830. The fixing base 500 includes a base socket 510, a magnet 520, a battery 530, and a second circuit board 540. The charging plug 400 and the button 600 are fixedly installed on the second circuit board 540. The base socket 510 is located on the fixing base 500; the magnet 520, the battery 530, and second circuit board 540 are fixed inside the fixing base 500. The fixing base 500 is fixedly connected to the translucent body 700. The connection base 800 is fixed to the fixing base 500 by a magnetic attraction of the magnetic attraction member 300 and the magnet 520, and the connection plug (not shown in the drawings) of the connection base 800 is electrically connected to the base socket 510.

The power supply circuit of an LED color-changing lamp of the present disclosure includes an input rectification circuit, an input filtering circuit, a control circuit, a transformer T1, an output rectification circuit, and an output filtering circuit. An input terminal of the input rectification circuit is connected to an AC power, an output terminal of the input rectification circuit is connected to the input filtering circuit. The input filtering circuit and the control circuit are both connected to an original side of the transformer T1, the output rectification circuit and the output filtering circuit are both connected to a secondary side of the transformer T1. The control circuit includes a first chip U1, the first chip is in a model of MT3612, the MT3612 chip is an original side feedback control chip that integrates with a power switch transistor and a PWM controller; so that, the circuit is more integrated, which can reduce the number of components in the circuit, simplify the circuit structure, and is conducive to reducing volume.

This specification uses specific examples to explain the principles and embodiments of the present disclosure. The above embodiments are only used to help understand the method and core idea of the present disclosure; and, for technical personnel in this field, there may be changes in the specific implementation and application scope based on the ideas of the present disclosure. In summary, the content of this specification should not be understood as limiting the present disclosure.

What is claimed is:

1. A power supply circuit for an LED color-changing lamp, comprising an input rectification circuit, an input filtering circuit, a control circuit, a transformer T1, an output rectification circuit, and an output filtering circuit;

an input terminal of the input rectification circuit is connected to an AC power, an output terminal of the input rectification circuit is connected to the input filtering circuit; the input filtering circuit and the control circuit are both connected to an original side of the transformer T1, the output rectification circuit and the output filtering circuit are both connected to a secondary side of the transformer T1;

the control circuit comprises a first chip U1, a resistor R1, a resistor R3, a resistor R4, a resistor R6, a resistor R7, a resistor R8, a capacitor C1, an electrolytic capacitor EC4, a diode D1, and a diode D2; the first chip is in a model of MT3612;

a VCC pin of the first chip U1 is connected to a first end of the original side of the transformer T1 through the resistor R8;

a C0 pin and a C pin of the first chip U1 are both connected to a positive pole of the diode D1;

a negative pole of the diode D1 is connected to the first end of the original side of the transformer T1 through the resistor R3;

a second end of the original side of the transformer T1 is connected to the positive pole of the diode D1;

one end of the resistor R1 is connected to the negative pole of the diode D1, and the other end of the resistor R1 is connected to the first end of the original side of the transformer T1 through the capacitor C1;

a CS pin and an E pin of the first chip U1 are both grounded through the resistor R4;

a positive pole of the electrolytic capacitor EC4 is connected to the VCC pin, a negative pole of the electrolytic capacitor EC4 is grounded, a FB pin of the first chip U1 is connected to a third end of the original side of the transformer T1 through the resistor R7, the third end of the original side of the transformer T1 is further connected to a positive pole of the diode D2, and a negative pole of the diode D2 is connected to the VCC pin;

one end of the resistor R6 is connected to the FB pin, and the other end is grounded;

a fourth end of the original side of the transformer T1 is grounded.

2. The power supply circuit according to claim 1, wherein the input rectification circuit comprises a bridge rectifier DB1, a first input terminal of the bridge rectifier DB1 is connected to a live wire, a second input terminal of the bridge rectifier DB1 is connected to a neutral wire, a first output terminal of the bridge rectifier DB1 is grounded, and a second output terminal of the bridge rectifier DB1 is connected to the input filtering circuit.

3. The power supply circuit according to claim 2, wherein the input filtering circuit comprises a resistor R2, an inductor L1, an inductor L2, an electrolytic capacitor EC2, and an electrolytic capacitor EC3;

one end of the resistor R2, one end of the inductor L1, and a positive pole of the electrolytic capacitor EC3 are all connected to the second output terminal of the bridge rectifier DB1; the other end of the resistor R2, the other end of the inductor L1, and a positive pole of the electrolytic capacitor EC2 are all connected to the first end of the original side of the transformer T1;

one end of the inductor L2 and a negative pole of the electrolytic capacitor EC3 are grounded, and the other end of the inductor L2 and a negative pole of the electrolytic capacitor EC2 are grounded.

4. The power supply circuit according to claim 1, further comprising a capacitor CY1, and both ends of the capacitor CY1 are grounded.

5. The power supply circuit according to claim 1, wherein the output rectification circuit comprises a second chip U2, the second chip U2 is in a model of MT6704, a VCC pin of the second chip U2 is connected to a first end of the secondary side of the transformer T1;

a SW pin, a SW1 pin, a SW2 pin, and a SW3 pin of the second chip U2 are all connected to a second end of the secondary side of the transformer T1, a GND pin, a GND1 pin, and a GND2 pin of the second chip U2 are all grounded.

6. The power supply circuit according to claim 5, wherein the output filtering circuit comprises an electrolytic capacitor EC1 and a resistor R5, a positive pole of the electrolytic capacitor EC1 and one end of the resistor R5 are both connected to the first end of the secondary side of the transformer T1, and a negative pole of the electrolytic capacitor EC1 and the other end of the resistor R5 are both grounded.

7. The power supply circuit according to claim 1, wherein the input terminal of the input rectification circuit is further connected to a fuse F1.

8. A color changing LED lamp, comprising an LED lamp body and a power supply circuit configured to drive the LED lamp to emit light, wherein the power supply circuit is according to claim 1.

9. The color changing LED lamp according to claim 8, wherein the LED lamp body comprises a Lamp bead, a bulb base, a magnetic attraction member, a charging plug, a fixing base, a button, and a translucent body;

wherein the magnetic attraction member is fixedly connected to a bottom of the bulb base, the bulb base has a connection plug, the fixing base is fixedly connected to the translucent body;

the power supply circuit, the charging plug, and the button are fixedly installed inside the fixing base;

the control circuit board has the power supply circuit, and the fixing base further has a base socket and a magnet that cooperates with the magnetic attraction member, so that the bulb base is fixed on the fixing base by a magnetic attraction of the magnetic attraction member, and the connection plug of the bulb base is electrically connected to the base socket.

* * * * *